United States Patent
Harutyunyan et al.

(10) Patent No.: US 7,014,737 B2
(45) Date of Patent: Mar. 21, 2006

(54) METHOD OF PURIFYING NANOTUBES AND NANOFIBERS USING ELECTROMAGNETIC RADIATION

(75) Inventors: Avetik Harutyunyan, Columbus, OH (US); Bhabendra K. Pradhan, Kennesaw, GA (US); Peter C. Eklund, Boalsburg, PA (US)

(73) Assignee: Penn State Research Foundation, University Park, PA (US)

( * ) Notice: Subject to any disclaimer, the term of this patent is extended or adjusted under 35 U.S.C. 154(b) by 602 days.

(21) Appl. No.: 10/174,477

(22) Filed: Jun. 17, 2002

(65) Prior Publication Data

US 2003/0042128 A1    Mar. 6, 2003

Related U.S. Application Data (60) Provisional application No. 60/298,478, filed on Jun. 15, 2001.

(51) Int. Cl.
*D01F 9/12* (2006.01)
(52) U.S. Cl. .............................. 204/158.2; 423/447.1; 423/461; 502/27; 502/56
(58) Field of Classification Search ............ 204/158.2; 502/27, 56; 423/447.1, 447.2, 447.3, 445 R, 423/445 B, 461
See application file for complete search history.

(56) References Cited

OTHER PUBLICATIONS

Ilijima et al, Single-Shell Carbon Nanotubes Of 1-NM Diameter, Nature, (1993) pp. 603-605.
Bethune et al, Cobalt-Catalysed Growth of Carbon Nanotubes With Single-Atomic-Layer Walls, Nature, (1993) pp. 605-607.
Tohji et al, Purification Procedure For Single-Walled Nanotubes, J. Phys. Chem. B, 101 (1997) pp. 1974-1978.
Shi et al, Purification of Single-Wall Carbon Nanotubus, Solid State Communications, 112 (1999) pp. 35-37.
Mizoguti et al; Purification of Single-Wall Carbon Nanotubes By Using Ultrafine Gold Particles, Chemical Physics Letters, 321 (2000) pp. 297-301.
Zimmerman et al, Gas-Phase Purification Of Single-Wall Carbon Nanotubes, Chem. Mater, 12 (2000) pp. 1361-1366.
Dujardin et al, Wetting of Single Shell Carbon Nanotubes, 10 (1998) pp. 1472-1475.
Rinzler et al, Large-Scale Purification Of Single-Wall Carbon Nanotubes: Process Product, And Characterization, Appl. Phys. 67 (1998) pp. 29-37.
Dillion et al, A Simple And Complete Purification of Single-Wall Carbon Nanotube Materials, Adv. Mater, 11 (1999) pp. 1354-1358.
Bandow et al, Purification of Single-Wall Carbon Nanotubes By Microfiltration, J. Phys. Chem. 101 (1997) pp. 8839-8842.
Shelimov et al, Purification of Single-Wall Carbon Nanotubes By Ultrasonically Assisted Filtration, Chemical Physics Letter, 282 (1998) pp. 429-434.
Harutyunyan et al, Purification of SWNTs Using Microwave Heating, Mat. Res. Soc. Symp. Proc., 706 (2002) pp. Z2.8.1-Z2.8.5.
Roy et al, Full sintering Of Powder-Metal Bodies in A Microwave Field, Nature 399 (1999) pp. 668-670.
Kim et al. The Interaction Of Hydrocarbons With Copper-Nickel And Nickel In The Formation of Carbon Filaments, Journal Of Catalyst 131 (1991) pp. 60-73.
Eklund et al, Vibrational Modes Of Carbon Nanotubes; Spectroscopy And Theory, Carbon, 33 (1995) pp. 959-972.
Endo et al, Raman Spectroscopic Characterization Of Submicron Vapor-Grown Carbon Fibers And Carbon Nanofibers Obtained By Pyrolyzing Hydrocarbons, J. Mater. Res. 14 (1999) pp. 4474-4477.
Pradhan et al. Large Cryogenic Storage Of Hydrogen In Carbon Nanotubes At Low Pressures, Mat. Res. Soc. Symp. Proc., 706 (2002) pp. Z10.3.1-Z10.3.6.
Moon et al; High-Yeild Purification Process Of Singlewalled Carbon Nanotubes; J. Phys. Chem. (2001) 105 pp. 5677-5681.
Chiang et al; Purification And Characterization Of Single-Wall Carbon Nanotubes; J. Phys. Chem (2001) 105 pp. 1157-1161.

*Primary Examiner*—Stanley S. Silverman
*Assistant Examiner*—Peter Lish
(74) *Attorney, Agent, or Firm*—McDermott Will & Emery LLP (57) ABSTRACT

Disclosed are methods of purifying mixtures comprising nanofibers and/or nanotubes and residual catalyst particles that are covered by outer layers of the nanotube or nanofiber material. The mixtures are exposed to electromagnetic radiation, which induces localized heating in the residual catalyst particles. The localized heating creates breaches in the outer layers. Thereafter, the residual catalyst particles may be removed under relatively mild conditions that do not significantly affect the structural integrity of the nanotubes or nanofibers. The methods of the invention have been used to particular advantage in the purification of single wall carbon nanotubes (SWNTs) synthesized using metal catalysts. For these SWNTs, microwave radiation is preferably used to induce the localized heating, the outer layers are preferably removed at least in part by carrying out the localized heating under air, and the residual catalyst may be removed by exposure to relatively dilute aqueous acid.

35 Claims, 6 Drawing Sheets

METHOD OF PURIFYING NANOTUBES AND NANOFIBERS USING ELECTROMAGNETIC RADIATION

PRIORITY CLAIM

The present application claims priority to U.S. Provisional Appln. No. 60/298,478, filed on Jun. 15, 2001, which is incorporated by reference herein in its entirety.

BACKGROUND OF THE INVENTION

The present invention relates to the synthesis and purification of nanotubes and nanofibers. Nanotubes and nanofibers are important subclasses of nanostructured materials. Nanostructured materials are materials that have at least one dimension in the length scale of 1 to 100 nanometers. It is believed that nanostructured materials will enable the creation and use of structures, devices and systems that have novel properties and functions because of their small size. These novel and differentiating properties and functions are developed at a length scale of matter typically under 100 nm, and the length scale is maintained when the nanostructured materials are combined to form larger structures.

Nanofibers are nanostructured materials with a relatively high aspect ratio, that is, ratio of length to width. They have been made from both inorganic and organic materials, including ceramics, organic and biological polymers, metals, and semiconductors.

Nanofibers that are electrical conductors or semiconductors are also referred to as nanowires. They have been made from materials including metals, carbon, silicon, metal suicides, and other known semiconductors, for example, binary group III/V materials (GaAs, GaP, InAs, and InP), ternary III/N materials (GaAs/P, InAs/P), binary IINI compounds (ZnS, ZnSe, CdS, and CdSe), and binary SiGe alloys.

Nanotubes are structurally similar to nanofibers; however, they are hollow and exhibit a high level of molecular order. Carbon nanotubes, for example, appear to be made up of graphene sheets rolled to form seamless hollow tubes. Nanotubes may be electrical conductors or semiconductors. In addition to carbon, nanotubes have also been made from other materials, such as, for example, boron nitride.

Carbon nanotubes and single wall carbon nanotubes (SWNTs) in particular, have generated great interest in the scientific community. It has been reported that the electrical conductivity of carbon nanotubes is comparable to that of copper, that their thermal conductivity is comparable to that of diamond, and that their tensile strength is more than 100 times that of steel. It is predicted that the use of carbon nanotubes in composites can reduce weight by a factor of 5 to 10, while increasing the strength by a factor of 5 to 10 compared to a conventional carbon fiber matrix. No other material is known to be a superior field-emitter. It is therefore predicted that carbon nanotubes will improve many electronic devices, increasing their effectiveness and service life. For example, it is anticipated that the physical properties of carbon nanotubes will be of particular importance in the production of a new class of flat-panel displays used for computers, televisions, and other video screens.

It is apparent that, without facile techniques for synthesis and isolation, the technological utility of nanotubes and nanofibers, including carbon nanotubes, will not be realized to its fullest extent. In addition, the favorable physical properties that are predicted by theory are attenuated or lost when the nanotubes or nanofibers are contaminated by impurities.

Many of the proposed applications of SWNT, including nano-electronic devices, field emitters, gas sensors, high-strength composites, and hydrogen storage require reasonably pure SWNT materials.

Typical synthetic methods currently produce carbon tubes having a diameter in the range of 1–2 nm and arranged in the form of bundles. One particular problem associated with conventional synthetic techniques is that the intended SWNT is a minority constituent in the reaction product. Also present, for example, are amorphous sp2 carbons which coat the fiber walls and multi-shell carbon species which cover metal catalyst impurities that result from the catalytic production of conventional carbon fibers and SWNTs. It is a challenging problem to separate the desired SWNT from its accompanying mixture of amorphous carbon impurities, multi-shell carbon species and metal impurities without adversely damaging the carbon fiber or the tube walls.

Many purification procedures have been developed to remove the inherent contaminates from carbonaceous soots produced in an effort to obtain the desired SWNT. These methods include hydrothermal treatment, gaseous or catalytic oxidation, nitric acid reflux, peroxide reflux, cross flow filtration, and chromatography.

These treatments, however, tend to chemically destroy a significant portion of the desired carbon nanotubes, require excessive production times and, in the case of arc produced carbon nanofibers, have a marginal effect in purifying the desired carbon nanofibres from its impurities, such as amorphous carbon phases and graphitic carbon phases covering metal impurities. It is also unfortunate that the results of many of these purification processes have not been even semi-quantitatively determined with respect to the purity of the final product. Thus, they have been of little aid to the skilled artisan in advancing the understanding of purification procedures thereby reducing the predictability of successfully achieving a process of purifying SWNT in high yield and throughput.

Furthermore, most of the purification processes reported previously were for carbon-nanofibers produced by a pulse laser vaporization (PLV) process which inherently produces smaller amounts of catalyst residue and smaller amounts of multi-shell carbon phases as well.

One known method of removing residual catalyst particles and undesirable product phases is carried out under generally harsh conditions, such as, for example, heating at reflux in full strength aqueous $HNO_3$ (67% by wt), or exposure to gaseous oxidizing agents at high temperature. Such methods, aside from their expense and inherent hazards, are deficient because the nanotube or nanofiber product is degraded under the severe conditions, causing a loss of product, or a decrease in the desirable properties of the product. When the residual catalyst particles are completely surrounded by shells or outer layers, the losses are especially severe, because it is difficult to distinguish between the nanotubes or nanofibers and the outer layers, which are both structurally and chemically similar to the desired product.

Another known purification method that has been used extensively for SWNTs is the so-called "selective oxidation" in air or oxygen of undesirable minority phases, such as amorphous carbon, multishell carbon, and carbon "onions." In fact, the oxidation is not completely selective, because, inevitably, some SWNTs are also converted to CO and/or $CO_2$. Conditions such as temperature, time, flow of dry air, etc., are chosen to create a combustion which preferentially removes amorphous carbon, and, to a lesser extent, other carbons. Conditions are also adjusted to minimize the loss of SWNTs from the sample. A significant portion of the SWNTs is usually lost in selective oxidations, nevertheless, because the SWNTs are structurally similar to the multishell carbon encasing the metal particles, and therefore also react with dry air at approximately the same temperature. Reported yields of the carbon nanotubes for different purification approaches vary from 1 wt % to up to 25–30 wt %.

Several recent publications report that heating the crude SWNT reaction product in dry air in the temperature range 300–500° C. was carried out as a first step whose purpose was to remove the amorphous carbon and to weaken the multishell carbon covering the metallic particles. This oxidation step, like the selective oxidation described above, cannot be carried out without a significant loss of SWNTs.

Thus, there remains a need for improved methods of isolating and purifying nanotubes and nanofibers, especially SWNTs.

SUMMARY OF THE INVENTION

In one embodiment, the invention provides a process for purifying a mixture of nanotubes or nanofibers with particles of a catalyst residue. The process comprises inducing localized heating of the particles by exposing them to electromagnetic radiation or an electromagnetic field, and removing the particles.

In another embodiment, the invention provides a process for purifying nanotubes or nanofibers. The nanotubes or nanofibers are synthesized by a process that yields a mixture of nanotubes or nanofibers with particles of a catalyst residue. The particles, which are removed in the process of the invention, are surrounded completely or incompletely by outer layers whose composition is similar to the composition of the nanotubes or nanofibers. The outer layers are optionally removed in the process of the invention.

In another embodiment, the invention provides a process for purifying carbon nanotubes. In the process of the invention, the carbon nanotubes are synthesized by a process that yields a mixture of carbon nanotubes and particles of a catalyst residue. The residue particles are surrounded completely or incompletely by outer layers of graphene carbon. The particles are exposed to electromagnetic radiation or an electromagnetic field. The particles are removed in the process of the invention, and the outer layers are optionally removed.

BRIEF DESCRIPTION OF THE DRAWINGS

FIG. 2(a) depicts the crude reaction product, that is, as-prepared arc-derived SWNTs synthesized using Ni—Y catalyst.

FIG. 2(b) shows the SWNTs after microwave heating at 500° C. under air.

FIG. 2(c) shows a metal particle covered with multishell carbon in the as-prepared sample.

FIG. 2(d) focuses on the surface of the metal particle after microwave treatment at 500° C. for 20 min.

FIG. 2(e) depicts an example metal catalyst particles sintering due to microwave heating.

FIG. 2(f) shows SWNT bundles after heating at reflux for 6 hours in relatively dilute hydrochloric acid (4M aqueous).

FIG. 3(a) is a graph of the TPO and DTPO data gathered in the analysis of a sample of as-prepared arc-derived SWNTs FIG. 3(b) is a graph of the TPO and DTPO data gathered in the analysis of a sample of SWNTs that has undergone microwave treatment at 500° C. for 20 min followed by heating at reflux in 4M HCl for 6 hours.

DESCRIPTION OF THE PREFERRED EMBODIMENTS

The present invention provides a methodology for processing nanostructures, such as nanotubes or nanofibers, by removing unwanted impurities. To remove the unwanted impurities, preferably some of the impurities are subjected to localized heating. After the step of localized heating, preferably the impurities can be removed more readily.

As discussed below in greater detail, during the production of nanostructures several impurities form or accumulate around the nanostructures. For example, when single walled carbon nanotubes (SWNTS) are formed, the impurities include residual catalyst, amorphous carbon, and carbon shells that encase the residual catalyst. Since the shells encase the residual catalyst, it is desirable to remove or deteriorate the shells so that the residual catalyst can be more readily removed.

To deteriorate the shells, preferably the shells are locally heated, such as by exposure to an electromagnetic field or electromagnetic radiation. In some instances, the localized heating may be direct, in other instances, the residual catalyst may be locally heated, which in turn heats the shell since the shell adjacent the catalyst. Optionally, the nanostructures may be cooled by fluid flow during the step of localized heating. In addition, the cooling fluid may be selected to be a fluid that is reactive with the shells to facilitate the deterioration of the shells. For instance, in the case of SWNTs, the cooling fluid may be an oxidizing fluid, such as air, which may oxidize the shells.

After the step of localized heating the residual catalyst can be readily removed by chemical treatment, such as by exposure to a relatively dilute acid. If necessary, other steps may be taken to remove other impurities, such as removing amorphous carbon.

The details of each step will now be provided in greater detail. Specifically, the step of producing the nanostructures will be described in detail.

Producing Nanostructures

Although the present methodology is particularly suited to processing SWNTs, the methodology is also operable to process other nanostructures, including, but not limited to carbon nanotubes, single walled carbon nanotubes (SWNTs), boron nitride, metals, silicon, metal silicides, and other known semiconductors, for example, binary group III/V materials (GaAs, GaP, InAs, and InP), ternary III/V materials (GaAs/P, InAs/P), binary II/VI compounds (ZnS, ZnSe, CdS, and CdSe), and binary SiGe alloys.

Nanofibers and nanotubes may be synthesized by various processes, including laser ablation, arc discharge, chemical vapor deposition, solar furnaces, and other methods. Overarching these various synthetic methods, several mechanisms have been proposed for nanotube or nanofiber formation reactions. One proposed mechanism, which is described in some detail herein, as an illustrative example, is the vapor-liquid-solid (VLS) mechanism.

In VLS-type mechanisms, a material that facilitates the formation of nanofibers and nanotubes is necessary. This material is referred to as the "catalyst," although it is not a traditional catalyst as the term is commonly employed in solution chemistry. The catalyst may be a metal, a metal oxide, or an alloy. The oxide or alloy may contain the material from which the nanotubes or nanofibers are to be formed, as when silicon nanofibers are formed from a silicon-gold alloy.

The catalyst is heated and exposed to the vapor phase of the material from which the nanotubes or nanofibers are to be formed. For example, in a chemical vapor deposition process, finely divided metal particles may be placed in an inert boat in a furnace, and exposed to flowing methane, ethylene, carbon dioxide, or other suitable carbon-containing gas. Alternatively, a target containing both the catalyst and the starting material from which the nanotubes or nanofibers are to be formed is ablated with a laser. In either case, according to the VLS mechanism, the catalyst and the nanotube or nanofiber starting material form liquid droplets, which become supersaturated with the starting material, thus beginning nanotube or nanofiber growth. The VLS mechanism therefore accounts for the observed dependence on catalyst particle size of the diameter of the nanotube or nanofiber, or the bundle of nanotubes or nanofibers formed by certain synthetic procedures. The nanotube or nanofiber growth is continued through supplying additional starting material, and is ended by lowering the temperature of the reaction mixture below the melting point of the droplets.

The crude reaction product of a VLS process, therefore, includes nanotubes and/or nanofibers, or bundles of nanotubes and/or nanofibers. The nanotubes, nanofibers, or bundles terminate in nanoparticles of catalyst that are surrounded or partially surrounded by shells of the nanofiber or nanotube material. Catalyst particles from which a nanotube or nanofiber or bundle did not form are also present, and are also coated or partially coated by shells of the nanofiber or nanotube material. Various other phases of the nanotube or nanofiber material may also be present, for example, an amorphous phase alone or as an outer layer of a crystalline nanofiber.

Preferably, the catalyst has slightly different physical properties from the nanotubes or nanofibers that may be exploited to effect localized heating. For example, it is desirable that there be a significant difference in electrical conductivity. The shape of the residual catalyst particles may also be exploited to produce localized heating by the methodolgy. The strength of the coupling between the particle and the electromagnetic field is influenced by the shape of the particle and its orientation in the field or cavity.

When the nanotubes are SWNTs, for example, it is preferable that the residual particles contain a metal such as iron, nickel, cobalt, or combinations thereof. Although the nanotubes are electrically conductive, they are not metallic, and the conductivity difference is significant enough to enable localized heating of the metal-containing residue, as described below.

Although the VLS mechanism has been set forth in some detail herein, the nature of the synthetic procedure or mechanism by which the nanotubes or nanofibers are formed is not dispositive of whether the methods of the invention may be successfully used to purify a given mixture. Rather, it is the morphology of the mixture containing the nanotubes or nanofibers that will determine the applicability of the methods of the invention, which are best employed when the nanotubes or nanofibers are part of a mixture that also contains residual catalyst particles that may be at least partially coated with outer layers. When there is a structural similarity between the nanotubes or nanofibers and the outer layer, localized heating of the catalyst particle is a way to generate a difference in reactivity that can lead to selective breach or removal of the outer layers.

Purifying Nanostructures

After the nanostructures are formed, it is desirable to remove various impurities. This purification step preferably includes a step of selectively inducing localized heating in the impurities, and then removing the impurities by a chemical treatment, as discussed further below.

Localized heating of the residual particles may be accomplished by exposing the crude product of a nanotube or nanofiber formation process, which includes nanotubes or nanofibers and the residual catalyst particles, to electromagnetic radiation or to an electromagnetic field. For example, residual particles which are electrically conductive may be selectively heated, in the presence of non-conducting nanotubes or nanofibers, by magnetic induction. Magnetic induction heating is resistive heating caused by eddy currents induced in the particles by exposure to a time-dependent magnetic field.

Alternatively, conducting and non-conducting materials that are present in the residual particles may be selectively heated by exposure to electromagnetic radiation. For example, irradiating a material with radiation of a frequency that excites the material may lead to increased temperature, as energy of the absorbed radiation may be dispersed as heat when the excited material returns to its ground state.

It is well known that various subatomic, electronic, and molecular constituents of a material may be selectively excited by electromagnetic irradiation. For example, X-ray irradiation known to excite electrons associated with atoms. Ultraviolet and visible irradiation are known to excite electrons associated with bonds. Infrared irradiation is known to excite asymmetric vibration of bonds. Irradiation with radio frequencies is known to excite atomic nuclei. Irradiation with microwave frequencies is known to induce quantum excitation of electrons and the rotational modes of certain small molecules, including gaseous water.

Microwave irradiation can also induce heating in certain materials by other, non-quantum mechanisms, including dipolar polarization, conduction, and interfacial polarization. Briefly, dipolar polarization results when polar molecules are placed in an oscillating electric field. At certain frequencies, the polar molecules will collide as they rotate to keep in phase with the field polarity. The increased number of collisions results in the generation of heat. Conductive heating occurs when the irradiated material is electrically conductive. The electrons or ions that give rise to the conductivity are moved through the material by their interaction with the electric field, producing induced currents that give rise to resistive heating of the material.

The interfacial polarization mechanism describes the microwave heating of materials that can be described as matrices of non-conductive materials including relatively small particles of an electrically conductive material. When the electrically conductive particles are irradiated, some of the incident microwaves are attenuated at the surface of the particle. This attenuation induces electrical currents that give rise to resistive heating, as described above for the conductive heating mechanism. Although this heating effect is negligible in bulk materials, it becomes more significant as the surface area to volume ratio of the conductor increases, that is, as the size of the conductive particles decreases. In addition, there may be physical or electronic interactions between the conductive particle and the non-conducting matrix at the particle-matrix interface that will affect the efficiency of heating by this mechanism.

The specific frequencies of electromagnetic radiation useful in the present methodology will vary, however, with the composition and structure of the residual particles. Any material, as a general rule, can be uniquely characterized by its absorption and emission of electromagnetic radiation. Once the nanofiber and the residual catalyst have thus been characterized, one of skill in the art will be able to select a frequency of electromagnetic radiation that will induce localized heating of the residual catalyst particles.

Those of skill in the art will readily appreciate that localized heating of the residual particles due to selective absorption of electromagnetic radiation of a particular frequency will become more efficient as selectivity increases. Selectivity of absorption is favored when there is a large difference in certain physical properties of the residual particles and those of the nanofibers and/or nanotubes. Physical properties that are relevant to the selectivity of the absorption include, for example, the absorption coefficients of each material for the radiation at the frequency of interest, the dielectric constants, resistivities, electrical conductivities, Those of skill in the art will readily determine whether residual particles of a particular composition have been selectively heated in the presence of nanotubes or nanofibers of a particular composition. Such a determination might be based on the degree of degradation, if any, of the structure or composition of the nanotubes or nanofibers after the exposure to an electromagnetic field or radiation. Degradation of nanotubes or nanofibers may be measured by means exemplified hereinbelow. A low level of degradation, especially in combination with a relatively efficient removal of the residual particles, indicates that the heating was most likely selective.

The localized heating effect may be optimized by adjustment of other variables. For example, when the mixture is exposed to electromagnetic radiation within a cavity, it is possible to place the mixture in different regions of the cavity. The ratio of magnetic field to electric field is not constant for waves confined to a cavity, as it is for freely transmitted electromagnetic radiation. The variability in this ratio may be used to advantage in the methods of the invention.

In certain embodiments of the invention, the nanotubes comprise carbon nanotubes and the residual particles comprise a metal. In these embodiments, the localized heating is preferably induced by exposing the crude reaction product comprising the carbon nanotubes and the residual catalyst particles to microwave radiation. Preferably, the frequency of the microwave radiation is about 2.45 GHz and its power is 150 W.

In summary, electromagnetic radiation including infrared or microwave frequencies is preferred for inducing localized heating. Radiation including microwave frequencies is more preferred. It is also preferable that there be a substantial difference between the residual particles and the nanotubes or nanofibers in their susceptibility to heating by exposure to electromagnetic fields or radiation at the frequency selected.

During the step of locally heating the impurities, it may be desirable to flow a fluid over the nanostructures to cool the nanostructures and/or oxidize the impurities. More specifically, localized heating of the residual particles may be enhanced by selectively transferring heat away from the nanofibers. Any appropriate means of heat transfer is suitable for use in the methods of the invention. For example, the crude reaction product may be contacted with a fluid whose temperature is lower than that of the heated particles. Ordinarily, contact with such a fluid will transfer heat away from the nanofibers more efficiently than from the residual particles, because the nanofibers generally have a higher ratio of surface area to volume. The fluid may be static or flowing, and preferably is flowing. The fluid may be a gas or a liquid, including, for example, air, nitrogen, oxygen, argon, helium, hydrochloric acid, nitric acid , and mixtures thereof.

The most preferred fluids for use in the methods of the present invention include air, nitric acid and mixtures thereof.

The major contaminant by weight in a crude reaction product containing nanotubes or nanofibers is usually the catalyst residue, especially when the catalyst is a relatively heavy metal. In mixtures that have undergone the localized heating described herein, mild chemical treatment, which leaves the nanofibers intact, is often sufficient to remove the residual catalyst particles from a sample treated according to the methods of the invention. Such mild chemical treatment may be performed sequentially or simultaneously with the localized heating. Mild chemical treatments include oxidations or reductions with reagents of intermediate strength or concentration, or exposure to acids or bases of intermediate strength or concentration.

Another mild chemical treatment is the removal of the residual particle by vapor transport. In vapor transport, a transition metal is reacted with elemental iodine and removed from the crude reaction product as a volatile metal iodide. Those of skill in the art will recognize that any chemical reaction leading to volatilization of the residual particle may result in vapor transport. The temperature at which these mild chemical treatments are carried out is preferably between about −78° C. and about 100° C., more preferably between about 25° C. and 100° C.

Preferably, the residual catalyst particles are removed by exposure to a relatively dilute acid. Also preferably, the concentration of the acid is between about 1M and about 10M. More preferably, the acid is aqueous hydrochloric acid at a concentration of about 4M to about 6M, or aqueous nitric acid at a concentration of about 2M to about 5M.

In the case of SWNTs, the catalyst usually contains a metal, such as iron, cobalt, nickel, or combinations thereof. The metal-containing residual particles may be removed by exposure to a relatively dilute acid. Preferably, the acid is an aqueous acid whose concentration is about 1 to about 10M. More preferably, the acid is aqueous hydrochloric acid at a concentration of about 4M to about 6M.

Removing the outer layers that are around the residual catalyst particles is often desirable, and may also be accomplished during or after the localized heating. The outer layers may rupture due to thermal expansion of the residual catalyst particle. The formation of such ruptures will be favored when the coefficient of thermal expansion of the particles is larger than that of the outer layers. The ruptures created in the outer layer appear to provide structural defects that are more reactive than the remainder of the outer layer, thus rendering the outer layer more susceptible to chemical degradation, as by oxidation, for example, at conditions that are milder than those that would also be damaging to the nanofibers.

The outer layer may be removed by any appropriate chemical means, for example by oxidation, reduction, dissolution, or by oxidation or reduction followed by dissolution of the reaction product. Suitable means for removing the outer layer include, for example, heating in an oxidizing atmosphere, such as, air, oxygen, mixture of oxygen with an inert gas, nitric acid and combinations thereof.

Preferably, the outer layer is removed simultaneously with the localized heating of the residual particles. This may be accomplished by using an atmosphere during the localized heating that is reactive with the outer layer. For instance, the atmosphere may include oxygen, nitric acid, hydrogen peroxide and combinations thereof. More preferably, the outer layer is removed simultaneously with the localized heating of the residual particles, and the localized heating takes place in an atmosphere containing oxygen, for example, in an air atmosphere.

In the specific instance of purifying SWNTs, the atmosphere includes suitable reagents and conditions for removing the graphitic outer layers, such as air, oxygen, mixture of oxygen with an inert gas, nitric acid, mixture of air with water and combinations thereof. More preferably, the atmosphere includes air or a mixture of air with water.

As noted above, it may be desirable to remove the outer layer during the step of localized heating. The temperature of the outer layer is increased as heat is transferred from the residual particle by conduction or radiation, providing another factor that accelerates its removal relative to the degradation of the nanofibers.

In addition, as described previously, it may be desirable to cool the nanostructures with a flow of fluid during the step of localized heating. It may be desirable to select the cooling fluid so that it is a chemical reagent that effects the removal of the residual particle or the outer layer or both, for example by oxidation. The use of such a fluid enables the localized heating to be performed simultaneously with the removal of both the residual catalyst particle and the outer layer. Preferred fluids for use in these embodiments include, for example, air, oxygen, hydrogen chloride, hydrogen bromide, hydrogen iodide, nitric acid, iodine and mixtures of air with water and combinations thereof. Most preferred fluids include air and other mixtures of oxygen with an inert gas or gases.

It is anticipated that most other phases or materials that may be present in mixtures or crude reaction products containing nanotubes or nanofibers will be sufficiently distinct, compositionally or structurally, from the nanotubes or nanofibers so that they may be removed by traditional means of purification. For example, amorphous carbon is relatively efficiently removed from SWNTs by selective oxidation in air.

In summary, various nanostructures, such as nanotubes or nanofibers, may be purified by inducing localized heating of residual catalyst particles, removing the particles, and optionally removing the outer layers of the particles. These methods, if used in combination with known methods of removing other impurity phases, provide the possibility of obtaining nearly pure nanotubes and nanofibers.

The present methodology may also be used to purify semiconductive nanostructures by removing electrically conductive nanostructures. Specifically, the exposure of a mixture of conductive and less conductive nanotubes or nanofibers to electromagnetic radiation or an electromagnetic field results in the selective localized heating of the conductive nanotubes or nanofibers.

The selective localized heating itself may be sufficient to lead to the decomposition of the conductive nanotubes or nanofibers. Alternatively, the conductive nanotubes or nanofibers may be removed by a chemical reaction, such as exposure to an oxidizing atmosphere, as described above. Such a chemical reaction may be carried out simultaneously or sequentially with the localized heating of the conductive nanotubes or nanofibers. That is, the localized heating will have the immediate effect of causing some decomposition reactions to proceed more quickly. Localized heating may also introduce structural flaws in the conductive nanotubes or nanofibers that can be exploited to preferentially react them with an oxidizing agent, for example, after the localized heating has dissipated. The destruction of the conducting nanotubes or nanofibers may be detected by optical spectroscopy, for example.

The following definitions apply to the terms as used throughout this specification, unless otherwise limited in specific instances.

The term "electromagnetic radiation" as used herein refers to radiation made up of oscillating electric and magnetic fields and propagated with the speed of light. Electromagnetic radiation includes gamma radiation, X-rays, ultraviolet, visible, and infrared radiation, and microwave, radar and radio waves.

The term "microwave radiation," as used herein, refers to electromagnetic radiation whose wavelength is between 0.01 and 1 meter. These wavelengths correspond to frequencies between 30 and 0.3 GHz.

The term "gasification," as used herein, refers to a reaction of a solid to form gaseous products, such as CO, $CO_2$, or $SiH_4$, for example.

The term "relatively dilute," as used herein, refers to a concentration that is less than the highest generally available concentration. For example, hydrochloric acid is generally available as a 37% aqueous solution, corresponding to a concentration of approximately 10M. An aqueous solution of hydrochloric acid whose concentration is about 4M to about 6M is, therefore, relatively dilute.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The following examples are provided to describe the invention in further detail. These examples are for illustrative purposes only, and are not intended to limit the invention in any way. All temperatures are given in centigrade degrees (°C) unless otherwise noted.

EXAMPLE 1

A. General Procedures

Single walled carbon nanotubes (SWNTs) were obtained from Carbolex, Inc. (Lexington, Ky.). The SWNTs were supplied as the crude reaction product of an arc-discharge process in which an Ni—Y catalyst had been added to the electrodes. The crude reaction product of an arc-discharge process, also known as soot and which included SWNTs and impurities such as residual catalyst, is considered by those of skill in the art to be the least tractable product from which to remove catalyst residue. The successful removal of catalyst residue and undesired carbon phases from soot thus constitutes an especially rigorous demonstration of the present methodology.

The level of residual catalyst in the Carbolex SWNT reaction product material is 4–6 atom % (20–40 wt %) as determined by temperature-programmed oxidation (TPO) using an IGA-3 thermogravimetric analyzer (TGA) (Hiden Analytical Ltd., Warrington, UK). In the TPO analysis, metal to carbon ratios are calculated from weight change data by assuming that all the carbon originally present is converted to CO and/or $CO_2$, and that all the metals originally present are converted to oxides. In the TPO measurements performed herein, the crude SWNT sample was maintained in a flow of dry air at 100 standard cubic centimeters per minute (sccm) while the temperature in the sample chamber of the TGA was ramped linearly in time (5° C./min) from 25 to 1000° C. The temperature (T) or time (t) dependence of the evolution of the sample mass (m) is measured.

During the TPO experiment, as the temperature increases and the carbon is combusted, the presence of various carbon phases in the crude reaction product is ascertained by weight loss at their characteristic combustion temperatures. The various phases may include, for example, amorphous carbon, graphitic sheets, nanofibers, carbon nanotubes, and SWNTs. The combustion temperatures are most precisely measured as peak positions in the derivative data (DTPO), i.e., plots of dm/dT vs. temperature. The positions of these peaks may be affected by the amount of residual catalyst in the sample. The DTPO peaks tend to shift to lower temperature as the level of residual catalyst increases, indicating that the growth catalyst can also act as an oxidation catalyst, thereby lowering the carbon combustion temperature.

Figure 1:
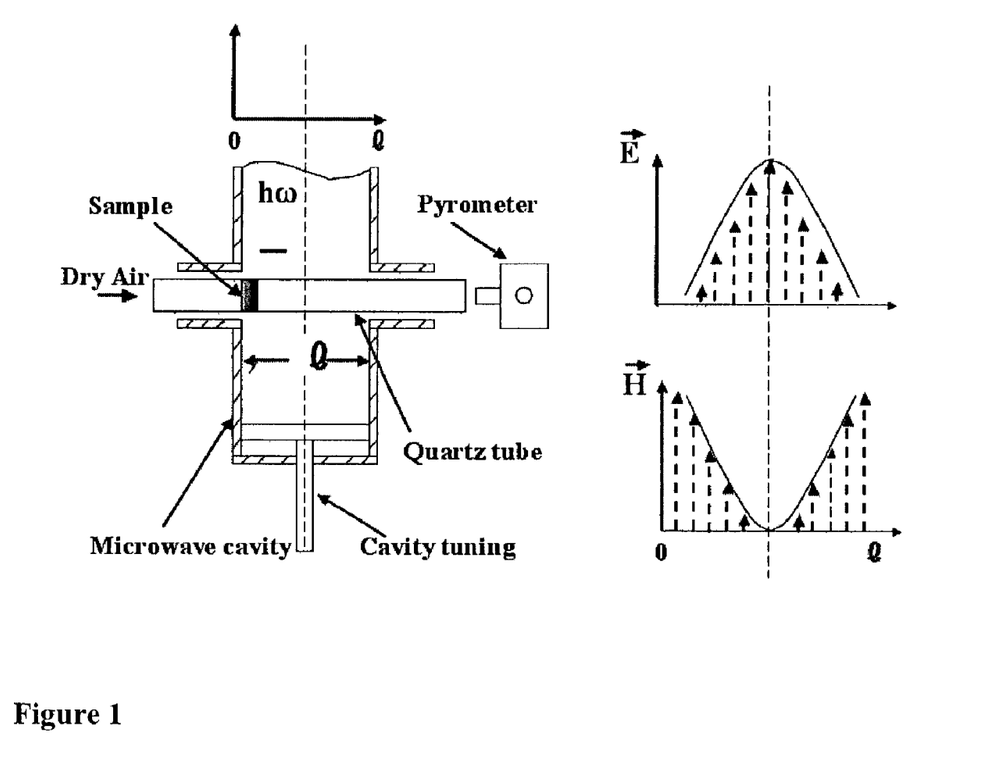
FIG. 1 is a schematic diagram of a microwave system. The sample is depicted in a microwave magnetic field distribution within a TE103 single mode microwave cavity.

Localized heating was induced by exposing the soot to microwave radiation at variable temperatures in flowing dry air (100 sccm). The exposure took place in a tuned TE103 single mode cavity driven by a 1.5 kW, 2.45 GHz power supply. A sample of the soot (100 mg) was placed in a quartz tube passing through the cavity. The apparatus is shown schematically in FIG. 1. The maximum microwave power was 150 W. The induced effective temperature in the sample was measured by an infrared optical pyrometer (Mikron M90BT, Mikron, Inc., Oakland, N.J.) with an accuracy of ±5° C.

The soot samples were placed in the cavity such that the magnetic field component of the electromagnetic radiation was maximized. Accordingly the selective heating of the ferromagnetic nickel catalyst particles occurs via the induced eddy currents, and the inductive heating of the metallic carbon nanotubes in the sample is minimized. As noted above, however, variability in the field ratio may be used to advantage in the methods of the invention.

The soot and the nanotubes were also characterized microscopically and spectroscopically at various stages of purification. Transmission electron microscopy (TEM) was performed on a JEOL JEM 1200EX instrument (JEOL USA, Inc., Peabody, Mass.) or a Hitachi 2000F instrument (Hitachi, Ltd. Tokyo, Japan). Scanning electron microscopy (SEM) was performed on a Philips XL 20 instrument (Philips Analytical Inc., Natick, Mass.). Raman scattering spectra were collected on a BOMEM DA 3+ FTIR spectrometer equipped with Nd:YAG Laser for excitation (1.06 $\mu$m) (ABB Bomem Inc., Quebec, Canada).

B. Morphological Characterization of Crude Material

Figure 2:
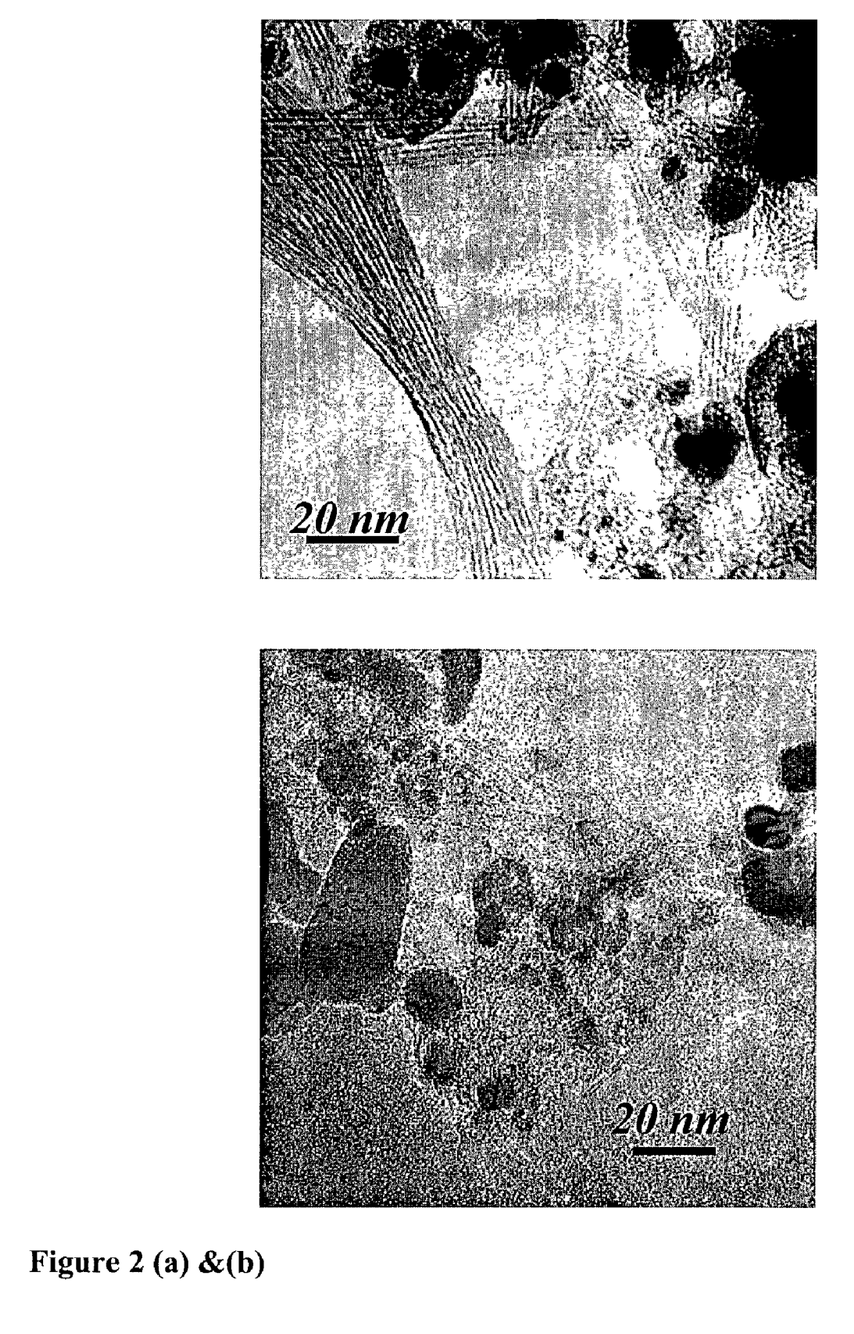
FIG. 2 includes transmission electron microscopy (TEM) and high resolution TEM (HRTEM) images of single wall carbon nanotubes (SWNTs) at various stages of synthesis and purification.

The morphology of the various components of the soot was determined by transmission electron microscopy of the as-prepared, arc-derived SWNTs, which revealed a high density of 1–4 micron long bundles of nanotubes whose mean bundle diameter was approximately 15 nm, as shown in FIG. 2(a). The SWNTs exhibited diameters in the range of 1 to 2 nm, as determined by Raman spectroscopy. The HRTEM images of a typical catalyst particle show that it is covered with about 10 graphitic carbon layers exhibiting a plane spacing of 0.34 nm, identified as the (002) plane (FIG. 2(c)). The chemical inertness of this covering is one reason for the notorious difficulty of purifying arc-derived SWNTs. An amorphous carbon coating on the outside of the nanotube bundles was also observed in the TEM images (FIG. 2(c)).

C. Selective Oxidation

As discussed above, selective oxidation in air or oxygen has been used to purify crude carbon nanotubes. For arc-derived tubes, the following conditions are optimal for selective oxidation: a temperature of 405° C. and dry air flow at 100 sccm, and maintenance of these conditions for 30 min. Although the metal content was relatively low, there was a significant loss in yield and severe damage to the walls of the remaining nanotubes.

D. Microwave Radiation

Localized heating of the residual catalyst particles in the soot was induced by exposing the soot to microwave radiation. FIG. 2(b) shows a TEM image of SWNTs after exposure to microwave radiation at 500° C. for 20 min in flowing dry air. After microwave heating, the carbon coating is observed to be almost completely removed from the surface of most of the residual particles, as demonstrated by the comparison of HRTEM images of a sampling of residual particles before and after microwave treatment (FIGS. 2(c) and 2(d), respectively).

After the microwave treatment (FIG. 2(d)), most of the catalyst particles are found to be free of the graphitic covering evident in FIG. 2(c). The lattice fringes of the metal-containing nanoparticle can also clearly be observed. The regular spacing of the observed lattice plane was 0.24 nm, which corresponds to the separation of (111) planes of cubic NiO. In general, all images of nanoparticles after microwave heating in air exhibited similar features. These TEM images support the conclusion that, during microwave heating in air, the carbon coating on the residual particles was primarily converted to $CO/CO_2$, and the metal (Ni) was converted to a metal oxide.

As shown in HRTEM image of FIG. 2(e), the local temperature at the particle surface also leads to partial sintering of the metal particles. This accounts for the change in the metal particle size, which is larger in FIG. 2(b) relative to FIG. 2(a).

E. Particle Removal

After the microwave exposure in an oxidizing atmosphere, the residual catalyst particles were at least partially exposed and therefore susceptible to removal by reaction with an acid under relatively mild conditions. FIG. 2(f) shows a HRTEM image of SWNT ropes after microwave processing and heating at reflux in 4M aqueous HCl for 6 hours. This image displays intact SWNT ropes and demonstrates that most of the metal particles have been removed by the HCl treatment. No structural damage to the SWNTs was detected by Raman scattering spectroscopy, as discussed below. After this procedure, the SWNTs contained less than 0.2 wt % of residual metals as measured by ash analysis or temperature programmed oxidation.

It has been found that heating the microwave-processed material in 4M HCl at about 60° C. for 6 hours is a fairly effective method of removing metal-containing particles. This method is more facile and economical than heating the materials at reflux for 6 hours. The DTPO data after treatment under these milder conditions reveal results similar to those shown in FIG. 3(b) which illustrate the DTPO data using heating at reflux in 4M aqueous HCl for 6 hours as discussed further below. Slightly more metal residue remained after the milder treatment, however (about 4 wt %).

When the reflux step is carried out in 3M $HNO_3$, no decrease in the metal content is detected relative to HCl reflux. Considerable damage to the tube walls was observed by Raman scattering spectroscopy, however.

F. Yield Calculations

The yield of SWNTs is a measure of the efficiency of the purification. After microwave treatment in air, the weight of the soot was reduced about 25 or 30 wt % of the as-prepared samples, as a result of oxidation of amorphous and multishell carbons. After acid treatment, samples weighed about 50% less than the microwave treated samples, mainly due to the removal of metal residue. Thus, the total yield for the two-step purification procedure is about 35 wt %. As one can see from TPO/DTPO curves, even after two step purification, the samples still contain multishell carbons (peak at T≈730° C.). It is obvious that the results of this yield calculation strongly depend on the amount of the metal residue in the as-prepared sample (about 35 wt % for the samples that were studied in this work).

G. Thermogravimetric Analysis

Figure 3:
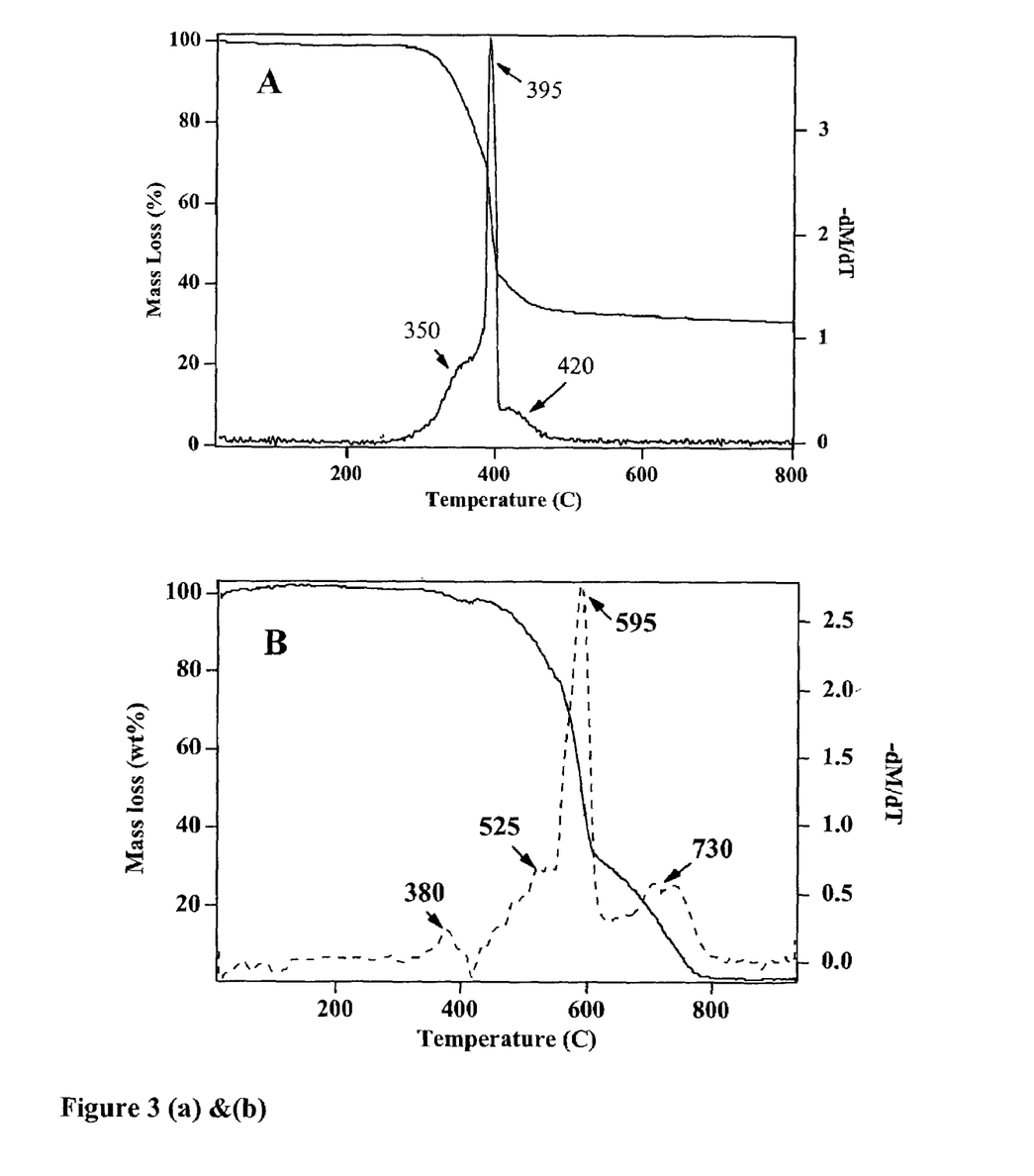
FIG. 3 shows the results of thermally programmed oxidation (TPO, solid curve) and differential thermally programmed oxidation (DTPO, dashed curve) experiments on SWNT materials.

Comparison of the TPO data of the carbon nanotubes before and after purification demonstrates the success of the procedure. FIG. 3(a) shows the TPO and DTPO curves for the crude arc-discharge SWNT soot. A three-peak structure in the DTPO data is observed. The three peaks can be attributed to amorphous carbon (decomposition temperature approximately 350° C.), SWNTs (decomposition temperature approximately 400° C.) and multishell carbons (decomposition temperature approximately 450° C.). These three peaks are shifted to relatively low temperatures due to residual nanotube formation catalyst that also acts as an oxidation catalyst. The metal content (about 35 wt %) in the soot was calculated from the mass gain observed at 800° C., and appearing in the data on the far right edge of the TPO curve (FIG. 3(a)).

This assignment of DTPO peaks to the carbon phases is consistent with the literature, and is supported by TEM image analysis reported elsewhere. As can be seen in FIG. 3(a), the oxidation temperature ranges of several different carbon structures overlap the oxidation range for SWNTs. Therefore, global oxidation cannot be expected to selectively remove the amorphous carbon and multishell carbon phases.

Microwave processing of the as-prepared SWNTs followed by the 4M HCl treatment changed the TPO/DTPO characteristics dramatically, as shown in FIG. 3(b). First, all the peaks in DTPO data shift to higher temperatures, consistent with the removal of the metal-containing residue which can act as an oxidation catalyst. For example, the largest peak identified with the combustion of SWNTs is shifted about 200° C. higher (595° C. in FIG. 3(b), vs. 395° C. in FIG. 3(a)).

The low temperature shoulder in the DTPO data that is identified with amorphous carbon has also been reduced in magnitude. In addition, the separation between the large SWNT peak and the higher temperature peak identified with multishell carbon has increased from a temperature difference of about 40° C. to a difference of about 150° C. From the TPO, or m(T), data that are shown as a solid curve in FIG. 3(b), it is estimated that, after microwave treatment and 6M HCl reflux, only about 0.04 atom % metal remains in the sample. This corresponds to a reduction in metal content by a factor of about 200. These TGA results are confirmed by good agreement with energy dispersion X-ray microprobe measurements (energy dispersive X-ray analysis, or EDX).

H. Resonance Raman Scattering Spectra

Figure 4:
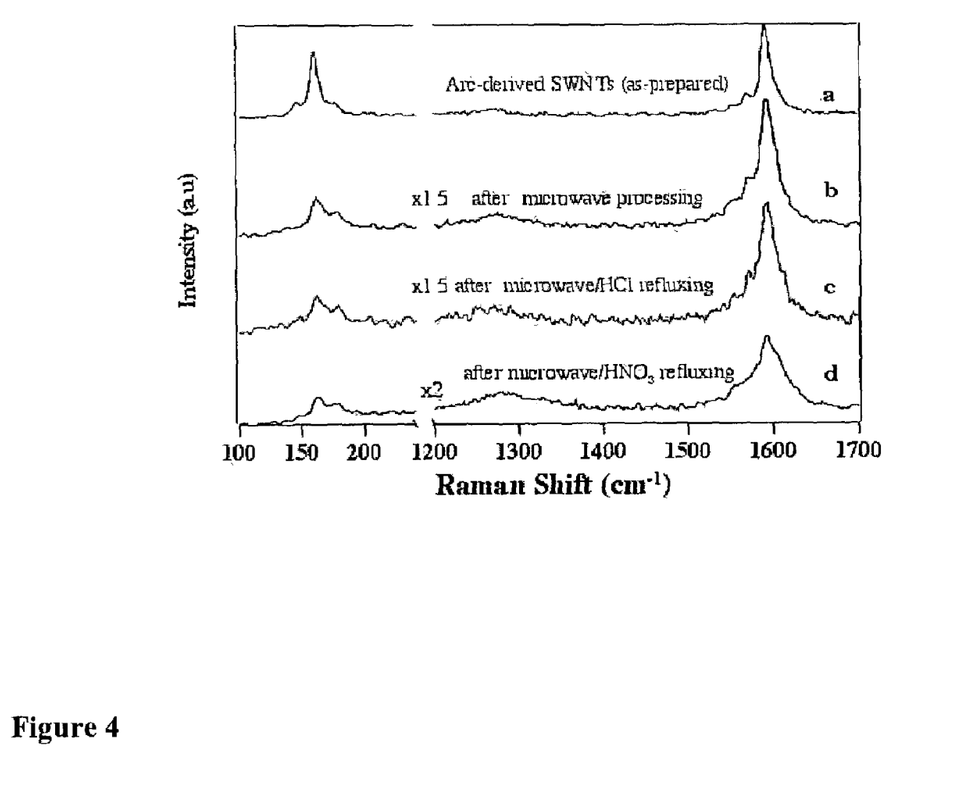
FIG. 4 depicts four room temperature Raman spectra of bundles of arc-derived carbon nanotubes at various stages of post synthesis processing. The spectrum labeled (a) was obtained from the crude reaction product of the SWNT synthesis. The spectrum labeled (b) was obtained from SWNTs that had been heated to 500° C. by exposure to microwaves in air. The spectrum labeled (c) shows the results obtained from SWNTs that had been heated at reflux in relatively dilute HCl after microwave heating at 500° C. under air. Spectrum (d) was obtained from SWNTs that had been heated at reflux in relatively dilute $HNO_3$ after microwave heating at 500° C. under air. The Raman spectra were taken using excitation at 1064 nm.

As described above, resonance Raman spectroscopy is used to measure the uniformity of the SWNTs and to quantify any damage to the SWNT structure that may have resulted from the purification process. Raman scattering spectra of arc-derived SWNT soots were taken at room temperature using IR excitation (wavelength=1064 nm). Four spectra are shown in FIG. 4: as-prepared (FIG. 4(a)), after microwave processing (FIG. 4(b)), as-prepared material subjected to microwave/HCl reflux purification treatment (FIG. 4(c)) and microwave/$NHO_3$ reflux treatment (FIG. 4(d)).

Three Raman bands are observed: approximately 190 $cm^{-1}$ (R), 1280 $cm^{-1}$ (D) and 1593 $cm^{-1}$ (T), where the letters (R, D, T) in parentheses refer to radial breathing mode, disorder band and tangential band, respectively. The D band can be activated by disorder in the tube wall. The D band's position is strongly dependent on the laser excitation frequency; it is a "dispersive" mode. Unfortunately, it is also present in the spectra of many disordered $sp^2$ carbons, and therefore is of limited utility in assessing damage to the SWNTs caused by the materials processing. The R and T bands, however, provide a useful measure of wall damage in the SWNTs. The full width at half maximum (FWHM) of these bands increases with increasing incidence of wall defects. This variability in band width arises because the level of structural defects affects the lifetime of phonons in the SWNTs.

Some significant changes in the Raman spectra of the SWNTs were observed after microwave and HCl reflux treatments. First, a slight broadening of the contributions to the R and T bands was observed after microwave processing (FIG. 4(b)). This broadening is believed to be associated with oxidation of the tube walls, and should be reversible by vacuum annealing at about 1000° C.

The spectrum in FIG. 4(c) is only slightly changed relative to the spectrum in FIG. 4(b), indicating that the HCl reflux was not seriously damaging to the SWNTs. FIGS. 4(b) and (4c) exhibit an interesting change in the R band structure relatively that in the as-prepared arc material (FIG. 4(a)). Notably, the lowest frequency (largest tube diameter) contribution is suppressed. It is possible that this result signifies that large diameter nanotubes are more likely to be damaged by the purification process. In the case of the microwave/ $HNO_3$ reflux treatment (FIG. 4(d)), significant line broadening in the T band is observed, and can be attributed to wall defects introduced during the more aggressive $HNO_3$ acid reflux. The D band in FIG. 4(d) is more intense than in the other spectra, suggesting that it might also be associated with wall defects.

EXAMPLE 2

Purification of Silicon Nanofibers

Silicon nanofibers are synthesized by laser ablation of a target containing silicon and gold. The crude product, including silicon nanofibers and silicon-covered, gold-containing particles, is exposed to microwave radiation. The outer layers of silicon on the silicon-gold alloy particles are removed or partially removed by gasification to silane. This is accomplished by conducting the localized heating in a reducing atmosphere, e.g., by flowing a mixture of 10% hydrogen in argon over the crude product during the exposure to microwave radiation. The resulting mixture is heated at reflux in relatively dilute aqua regia to remove the residual particles comprising gold from the silicon nanofibers.

Alternatively, the outer layer of silicon on the silicon-gold alloy particles is breached during the localized heating step due to the mismatch of the thermal expansion coefficients of the silicon and the silicon-gold alloy. The gold is dissolved in relatively dilute aqua regia or aqueous bromic acid.

While certain preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A process for purifying a nanostructure mixture, said mixture comprising
   a nanotube or a nanofiber, and a particle of a catalyst residue, said process comprising the steps of:
   inducing localized heating of said particle by exposing the mixture to electromagnetic radiation or an electromagnetic field; and
   removing the particle from the mixture.

2. The process of claim 1, wherein the localized heating is effected at least in part by exposure to a magnetic induction field.

3. The process of claim 1, wherein the localized heating is effected at least in part by exposure to microwave radiation.

4. The process of claim 1, wherein the localized heating is effected at least in part by cooling said nanofiber.

5. The process of claim 4, wherein the nanofiber is cooled at least in part by flowing a fluid over the mixture, wherein the fluid is selected from the group consisting of nitrogen, oxygen, argon, helium, hydrogen acid, nitric acid, and mixtures thereof.

6. The process of claim 1, wherein the particle comprises a metal, an oxide, a carbide, a silicide, a germanide, or an arsenide.

7. The process of claim 1, wherein the particle comprises a metal, a carbide, or a silicide.

8. The process of claim 1, wherein said nanotube or nanofiber comprises a material selected from the group consisting of carbon, silicon, germanium, gallium arsenide, gallium phosphide, indium arsenide, indiumphosphide, metal silicides, zinc sulfide, zinc selenide, cadmium sulfide, cadmium selenide, and mixtures thereof.

9. The process of claim 1, wherein said nanotube or nanofiber comprises carbon or silicon.

10. The process of claim 1, wherein the particle is at least partially surrounded by an outer layer comprising carbon, silicon, germanium, or gallium arsenide.

11. The process of claim 10, wherein the outer layer is at least partially removed.

12. The process of claim 10, wherein the localized heating and the removal of the outer layer are simultaneous.

13. The process of claim 10, wherein the outer layer is removed by gasification.

14. The process of claim 10, wherein the outer layer is removes by oxidation.

15. The process of claim 10, wherein the outer layer is removed by reaction with oxygen or hydrogen.

16. The process of claim 1, wherein the particle is removed by oxidation, dissolution, or both oxidation and dissolution.

17. The process of claim 16, wherein the particle is removed by reaction with a dilite acid.

18. The process of claim 16, wherein the particle is removed by vapor transport.

19. The process of claim 10, wherein the particle is removed by oxidation, dissolution, or both oxidation and dissolution.

20. The process of claim 19, wherein the local heating is effected by microwave radiation and by cooling the nanofiber by flowing a gas over the mixture, the particle comprises a metal, the removal of the outer layer is effected by heating in oxygen or a mixture comprising oxygen and an inert gas, and the removal of the particle is effected by dissolution in acid.

21. The process of claim 20 wherein the nanofiber is a carbon nanotube.

22. A process for purifying a nanostructure, comprising the steps of:
   synthesizing a nanofiber by a synthesis process, said synthesis process yielding the nanofiber and particles of a residue of a material promoting formation of said nanofiber, each of said particles being surrounded completely or incompletely by an outer layer of a composition similar to the composition of the nanofiber; locally heating the outer layers; and removing the particles.

23. A process for purifying carbon nanotubes, comprising the steps of:
   providing a mixture comprising the carbon nanotubes and particles of a catalyst residue, each of said particles being at least partially surrounded by an outer layer, said outer layer comprising graphene carbon;
   exposing the particles to electromagnetic radiation or an electromagnetic field; and removing the particles.

24. The process of claim 23 wherein the carbon nanotubes are single wall nanotubes.

25. The process of claim 23 wherein the catalyst is selected from the group consisting of iron, cobalt, nickel, or a combination thereof.

26. The process of claim 23 comprising exposing the particles to a magnetic induction field.

27. The process of claim 23 comprising exposing the particles to microwave radiation.

28. The process of claim 23 wherein the microwave radiation has a frequency of about 2.45 GHz and a power of about 150 W.

29. The process of claim 23 wherein the outer layers are at least partially removed.

30. The process of claim 29 wherein the removal is effected by contacting the mixture with a flowing gas during the exposure to the electromagnetic radiation or the magnetic induction field.

31. The process of claim 30 wherein the gas is selected from the group consisting of oxygen, air, hydrogen peroxide and hydrogen.

32. The process of claim 23 wherein the particles are removed by oxidation or dissolution or both oxidation and dissolution.

33. The process of claim 32, wherein the particles are removed by exposure to acid.

34. The process of claim 23 wherein the particles are exposed to microwave radiation; the outer layers are at least partially removed by flowing dry air over the mixture simultaneously with the exposure to microwave radiation; and the particles are removed by heating the mixture at reflux in dilute aqueous acid.

35. The process of claim 34 wherein the microwave radiation has a frequency of 2.45 GHz and a power of 150 W; wherein the radiation exposure generates a temperature of about 500° C. within the particles, which temperature is maintained for about 20 minutes; wherein the dry air is flowed at a rate of approximately 100 standard cubic centimeters per minute; wherein the dilute aqueous acid is hydrogen chloride at a concentration of approximately 4M; and wherein the mixture is heated at reflux in the dilute aqueous acid for approximately 6 hours.

* * * * *